US008521646B2

(12) United States Patent
Hoke et al.

(10) Patent No.: US 8,521,646 B2
(45) Date of Patent: Aug. 27, 2013

(54) SYSTEM AND METHOD FOR ASSIGNING AN INITIAL TRANSACTION FEE TIER TO A VENDOR IN A PAYMENT SYSTEM WITH A VARIABLE TRANSACTION FEE

(75) Inventors: Amy Beth Hoke, Gilford, NH (US); Christopher Curtis Martin, Portsmouth, NH (US); Claire Tierney Vadney, Stratham, NH (US)

(73) Assignee: Bottomline Technologies (de), Inc, Portsmouth, NH (US)

( * ) Notice: Subject to any disclaimer, the term of this patent is extended or adjusted under 35 U.S.C. 154(b) by 3 days.

(21) Appl. No.: 13/136,728

(22) Filed: Aug. 9, 2011

(65) Prior Publication Data

US 2012/0290469 A1 Nov. 15, 2012

Related U.S. Application Data

(63) Continuation-in-part of application No. 13/068,558, filed on May 13, 2011.

(51) Int. Cl.
*G06Q 40/00* (2012.01)

(52) U.S. Cl.
USPC ........................................................ 705/39

(58) Field of Classification Search
USPC ...................... 705/39, 40, 44; 235/379, 380
See application file for complete search history.

(56) References Cited

U.S. PATENT DOCUMENTS

| | | | | |
|---|---|---|---|---|
| 5,772,585 | A * | 6/1998 | Lavin et al. | 600/300 |
| 6,470,321 | B1 * | 10/2002 | Cumming et al. | 705/4 |
| 2008/0262919 | A1 * | 10/2008 | Ang et al. | 705/14 |

* cited by examiner

*Primary Examiner* — Jason M Borlinghaus
*Assistant Examiner* — Martin Gottschalk
(74) *Attorney, Agent, or Firm* — Timothy P O Hagan

(57) ABSTRACT

A system makes payments from a payer to a vendor and assesses a variable transaction fee to the vendor. The system comprises a database which associates, for each of a community of payers, identification a rate tier assigned to each vendor to which the payer makes payment. A tier assignment application determines a tier to assign to a vendor by determining: i) an industry sensitivity score based on the type of business the vendor operates; ii) a payer centric spend score; iii) a payer centric frequency score; iv) a network spend score; and iv) a network frequency score. The tier assigned to the vendor is a function of these scores. A payment application, when making payment from the payer to the vendor, determines a transaction fee to apply to the payment by multiplying the payment amount by a transaction rate associated with the tier assigned to the vendor.

8 Claims, 13 Drawing Sheets

| Vendor Registry 112 | | | | | | | |
|---|---|---|---|---|---|---|---|
| Vendor ID 130 | Name 132 | EIN 134 | S.I.C. 135 | Contact Information 136 | Remittance Address 138 | Remittance Account Information 140 | Payer Information 146 |
| | | | | | | | |
| | | | | | | | |
| | | | | | | | |

| Sensitivity Score 206 | |
|---|---|
| S.I.C. | Score 236 |
| 0001 | 0 |
| 0002 | 3 |
| 0003 | 5 |
| . . . | . . . |
| . . . | . . . |
| . . . | . . . |
| 9999 | 1 |

Figure 4B

| Weighting 237 | |
|---|---|
| Score | Weight Factor 238 |
| Sensitivity Rating | 1.0 |
| Payer Centric Spend | 0.65, 0.2 if PCS>4 & PCF<2 |
| Payer Centric Frequency | 0.85 |
| Network Spend | 0.75, 0.2 if NS>4 & NF<2 |
| Network Frequency | 0.95 |

Figure 4C

| Payer Centric Spend 240 | |
|---|---|
| Criteria | Score |
| 0 - $5,000 | 1 |
| $5,001 - $10,000 | 2 |
| $10,001 - $15,000 | 3 |
| $15,001 - $50,000 | 4 |
| $50,001 + | 5 |

Figure 4D

| Payer Centric Frequency 244 | |
|---|---|
| Criteria | Score |
| 1 | 1 |
| 2 - 3 | 2 |
| 4 - 10 | 3 |
| 11 - 15 | 4 |
| 16 + | 5 |

Figure 4E

| Network Spend 248 | |
|---|---|
| Criteria | Score |
| 0 - $5,000 PPA | 1 |
| $5,001 - $10,000 PPA | 2 |
| $10,001 - $15,000 PPA | 3 |
| $15,001 - $50,000 PPA | 4 |
| $50,001 + PPA | 5 |

Figure 4F

| Network Spend 252 | |
|---|---|
| Criteria | Score |
| 1 PPA | 1 |
| 2 - 3 PPA | 2 |
| 4 - 10 PPA | 3 |
| 11 - 15 PPA | 4 |
| 16 + PPA | 5 |

| Transaction Rates 148a | |
|---|---|
| Tier 150 | Rate 152 |
| Tier_1 | 0% |
| Tier_2 | .5% |
| Tier_3 | 1.25% |
| Tier_4 | 1.75% |
| Tier_5 | 2.25% |

154a

| Payer Registry 114 | |
|---|---|
| Payer ID 122 | Funding Information 124 |
| Payer 14a | Route A / Account A |
| Payer 14b | Route B / Account B |
| Payer 14c | Route C / Account C |

120

| Payer A - Vendor Group 140a | |
|---|---|
| Vendor ID 144a | Rate Tier 146a |
| Vendor 12a | Tier_1 |
| Vendor 12b | Tier_2 |
| Vendor 12c | Tier_3 |
| Vendor 12e | Tier_3 |
| Vendor 12g | Tier_4 |
| Vendor 12i | Tier_5 |

142a

| Transaction Rates 148b | |
|---|---|
| Tier 150 | Rate 152 |
| Tier_1 | 0% |
| Tier_2 | .75% |
| Tier_3 | 1.5% |
| Tier_4 | 2.25% |
| Tier_5 | 3.0% |

154

| Payer B - Vendor Group 140b | |
|---|---|
| Vendor ID 144b | Rate Tier 146a |
| Vendor 12a | Tier_1 |
| Vendor 12b | Tier_2 |
| Vendor 12c | Tier_3 |
| Vendor 12f | Tier_5 |
| Vendor 12h | Tier_5 |
| Vendor 12j | Tier_4 |

| Payment File 160a | | |
|---|---|---|
| Payer A 162 | | |
| Vendor ID 164 | Payment Amount 166 | Remittance String 170 |
| Vendor 12c | $100 | |
| Vendor 12e | $200 | |
| Vendor 12i | $300 | |

| Payment File 160b | | | |
|---|---|---|---|
| Payer ID 162 | Vendor ID 164 | Payment Amount 166 | Remittance String 170 |
| Payer B | Vendor 12b | $400 | |
| Payer B | Vendor 12c | $500 | |
| Payer B | Vendor 12f | $600 | |

| Payer ID 162 | Vendor ID 164 | Payment Amount 166 | Remittance String 170 |
|---|---|---|---|
| | | | |

161b

| Payer ID 162 | Vendor ID 164 | Payment Amount 166 | Remittance String 170 |
|---|---|---|---|
| | | | |

161c

| Payer ID 162 | Vendor ID 164 | Payment Amount 166 | Remittance String 170 |
|---|---|---|---|
| | | | |

Figure 7C

SYSTEM AND METHOD FOR ASSIGNING AN INITIAL TRANSACTION FEE TIER TO A VENDOR IN A PAYMENT SYSTEM WITH A VARIABLE TRANSACTION FEE

TECHNICAL FIELD

The present invention relates to electronic payment and remittance systems, more particularly, to an electronic payment and remittance system which assesses a variable transaction fee to each vendor, and more particularly to a system and method for assigning an initial transaction fee tier to each vendor, the initial transaction fee tier being used to calculate the transaction applicable to the vendor.

BACKGROUND OF THE INVENTION

Electronic payments are becoming more common place for settling both consumer and business to business transactions.

The most common electronic payment mechanism in the consumer world is a payment card such as a credit card, charge card, or debit card. Generally, payment cards are issued by an operator of a card payment system such as American Express or Diners Club (sometimes called a closed loop system), or by a bank or financial institution under licensing from a bank card brand provider such as Visa or Mastercard (formerly bank card associations).

In a card payment system, the financial institution issuing the card handles authorizations and all aspects of the transaction and settles payment with the merchant/vendor and the consumer/cardholder. More specifically, when a consumer pays for a purchase using a credit card issued as part of a card payment system, the merchant/vendor's point of sale terminal is used to obtain, from the issuer, an authorization for the payment amount. The authorization represents a guarantee that the issuer will pay the authorized amount. Once authorization is obtained the merchant/vendor can provide the goods or services without concern as to whether the consumer will pay for the goods or services because consumer credit risk is on the issuer that provided the authorization (guarantee of payment), not the merchant/vendor that obtained the authorization (guarantee of payment). To settle the transaction, the issuer pays the merchant/vendor the authorized amount less a transaction fee. The transaction fee is established by contract between the merchant/vendor and the card payment system operator/issuer at the time the merchant/vendor opens its merchant account with the close loop system operator/issuer.

When a bank or financial institution issues a payment card under licensing from a bank card brand provider such as Visa or Mastercard, the bank is referred to as the Issuing Bank. To accept payment by payment card issued under license from a bank card brand provider, a merchant/vendor opens a merchant account with a bank of financial institution that is also licensed by the bank card brand provider. Bank at which the merchant/vendor has its merchant account is called the Acquiring Bank. The Issuing Bank and the Acquiring Bank may be different banks.

When a consumer pays for a purchase using a payment card licensed under a bank card brand provider, the vendor's point of sale terminal is used to access the brand provider's settlement network and obtain an authorization for the payment amount. The authorization represents a guarantee that the Issuing Bank will fund the authorized amount. Once authorization is obtained, the transaction is processed. More specifically, the Acquiring Bank funds the vendor's Merchant Account with the amount of the transaction less a transaction fee that is established by contract between the Acquiring Bank and the merchant/vendor. The Acquiring Bank obtains payment from the Issuing Bank through the brand provider's settlement network and pays a fee, called an interchange fee, to the brand provider. The brand provider keeps a portion of the interchange fee and credits a portion of the interchange fee back to the Issuing Bank.

In the consumer world, card payment has grown dramatically since the first card payment systems were introduced in the late 1940s and 1950s (Diners Club in 1949, American Express in 1959) and the first association branded cards were introduced in 1966 (BankAmericard which is now VISA, a card brand provider, and InterBank Card which is now MasterCard, a card brand provider). One of the primary drivers of growth has been that merchant/vendors are willing to accept card payments and pay the corresponding transaction fee to eliminate credit risk of the individual consumer purchasing from the merchant/vendor. Once a transaction is authorized, payment to the merchant/vendor is guaranteed.

Recently, card issuers, in particular the bank card brand providers and their participating banks have been marketing card payments for business to business transactions. In general, an Issuing Bank issues a purchase card to a business and the business uses the card to pay vendors. Vendors must have a Merchant Account with an Acquiring bank and pay the applicable fees as determined by the Acquiring Bank. The Acquiring bank pays an interchange fee on the transaction, at least part of which is paid to the Issuing Bank. Currently purchasing card payments represent less than 4% of the business to business payments in the United States. It is speculated that purchasing card payments are not being adopted for business to business transactions as rapidly as adoption for consumer transactions for at least two reasons. First, most business to business payments are payments in the ordinary course of an ongoing relationship between the vendor and the payer and the vendor sees little credit risk in being paid. As such, the vendor sees little advantage of receiving a guarantee of payment at authorization, and while many vendors may be willing to pay a small transaction fee for the convenience of immediate payments, the guarantee of immediate payment is not enough to justify payment of the high fixed transaction fee charged by the Acquiring Bank. Second, purchase card payments are difficult for both the payer and the vendor to reconcile in their respective accounts payable and accounts receivable accounting systems without at least duplicating manual entry of at least some payment/remittance information in multiple systems.

Even though there has been little adoption of purchase cards and card payments for business to business transactions, business to business payers still seek electronic payment solutions to lower costs associated with traditional check payments, and possible generate revenue from, their accounts payable.

In view of the foregoing, what is needed is an improved electronic payment and remittance system that provides a flexible fee structure so that fees may be tailored to the value provided to a vendor for the convenience of receipt of electronic payment and rich remittance information; and an improved electronic payment and remittance system that provides a means of estimating such value and establishing a transaction fee structure commensurate therewith.

SUMMARY OF THE INVENTION

A first aspect of the present invention comprises a system for making payments from each payer of a community of payers to each vendor of a community of vendors and assessing a variable transaction fee to each vendor.

The system comprises a rate tier assignment application that determines an initial rate tier to assign to a vendor by: i) determining an industry sensitivity score, the industry sensitivity score being representative of how sensitive a typical vendor in the same type of business as the vendor is to payment of transaction fees; ii) determining a payer centric spend score; iii) determining a payer centric frequency score; iv) determining a network spend score; and iv) determining a network frequency score. These scores are used to determine an initial rate tier to associate with the vendor. A payment application, when making payment from the payer to the vendor, determines a transaction fee to apply to the payment. The transaction fee may be a product of the amount of the payment and the transaction rate associated with the selected rate tier, adjusted for a minimum and/or a maximum transaction fee, which may be configured by the payer.

In more detail, the system may comprise a database which associates, for each payer, identification a selected rate tier assigned to each vendor. More specifically, the database may comprise, in association with each payer of the group of payers, a rate tier sub database and a vendor sub database. The rate tier sub database identifies a transaction fee rate applicable to each rate tier of the payer's group of group of five (5) rate tiers. The vendor sub database identifies each vendor in a subgroup of vendors to which the payer makes payment. The subgroup of vendors may be fewer vendors than the entire community of vendors. In association with each vendor of the subgroup of vendors, the vendor sub database includes identification the selected rate tier assigned to the vendor. The selected rate tier may be one of the rate tiers of the group of rate tiers. The transaction rate for one vendor may be distinct from the transaction rate for other vendors that are not assigned to the same rate tier.

The rate tier assignment application comprising instructions stored in a memory and executed by a processor which, when executed, determines the selected rate tier for each vendor identified in the vendor sub database.

More specifically, in a base embodiment, the instructions comprise determining the industry sensitivity score for the vendor. For this purpose, the database may further include a sensitivity score sub database. The sensitivity score sub database may associate each of a group of industry codes with a sensitivity rating. The sensitivity rating may be one of a group of discrete or integer sensitivity rating values, for example integers one (1) through five (5).

Determining the industry sensitivity score for a vendor may comprise obtaining the vendor's standard industry code, or industry identifier, which represents the type of business the vendor carries on in commerce. The vendor's standard industry code, or industry identifier, may be obtained by looking it up in a vendor registry (if present in the vendor registry) or utilizing the vendor's name and/or tax ID number to look it up in a commercially available standard industry code database.

After the vendor's standard industry code, or industry identifier, is determined, the sensitivity score may be determined by looking up, in the sensitivity score sub database, the sensitivity rating associated with the vendor's standard industry code or industry identifier. The sensitivity score assigned to the vendor is then the sensitivity rating associated with the vendor's industry code as set forth in the sensitivity score sub database.

After the vendor's sensitivity score is determined, the instructions may further: i) use the industry sensitivity score to determine the selected rate tier to associate with the vendor; and ii) write identification of the selected rate tier to the vendor sub database in association with the vendor. Determining the selected rate tier may be by way of mapping the vendor's industry sensitivity score to a rate tier.

In an embodiment that further incorporates a payer centric spend score and a payer centric frequency score, the instructions may further comprise: i) determining a payer centric spend score for the vendor. The payer centric spend score may be a function of the aggregate amount of all payments the selected payer expects to pay the vendor during a predetermined period, such as one year; and ii) determining a payer centric frequency score for the vendor. The payer centric frequency score may be a function of the total quantity of payments the selected payer expects to pay the vendor during the predetermined period.

In this embodiment the instructions may further comprise determining an overall score. The overall score may be a function of the industry sensitivity score for the vendor, the payer centric spend score for the vendor, and the payer centric frequency score for the vendor. Using the industry sensitivity score to determine the selected rate tier to associate with the vendor may comprise using the overall score to determine the selected rate tier to associate with the vendor.

In an embodiment that further incorporates a network spend score and a network frequency score, the instructions may further comprise: i) determining a network spend score for the vendor. The network spend score for the vendor being a function of the aggregate amount of all payments expected to be paid to the vendor by multiple payers within the group of payers during the predetermined period; and ii) determining a network frequency score for the vendor. The network frequency score being a function of the total quantity of payments expected to be paid to the selected vendor by multiple payers within the group of payers during the predetermined period.

In this embodiment, the overall score is a function of the industry sensitivity score for the vendor, the payer centric spend score for the vendor, the payer centric frequency score for the vendor, the network spend score for the vendor, and the network frequency score for the vendor.

In all such embodiment, determining the overall score may comprise calculating a weighted average of the scores that are selected for use in determining the overall score. More specifically calculating the weighted average may comprise: i) multiplying the industry sensitivity score for the vendor by a first weight factor to determine a weighted industry sensitivity score; ii) multiplying the payer centric spend score for the vendor by a second weight factor to determine a weighted payer centric spend score—if a payer centric spend score is used in calculating the overall average; iii) multiplying the payer centric frequency score for the vendor by a third weight factor to determine a weighted payer centric frequency score—if a payer centric frequency score is used in calculating the overall average; iv) multiplying the network spend score for the vendor by a fourth weight factor to determine a weighted network spend score—if a network spend score is used in calculating the overall average; and v) multiplying the network frequency score for the vendor by a fifth weight factor to determine a weighted network frequency score—if a network frequency score is used in calculating the overall average. Each weight value may be distinct from other weight values. The overall score as the average of each weighted score.

In all embodiments, the payment application executed a payment from a selected payer to a selected vendor. The payment application comprises instructions stored in a memory and executed by a processor which, when executed: i) looks up, in the vendor sub database associated with the selected payer, the selected rate tier associated with the selected vendor; ii) looks up, in the rate tier sub database, the transaction rate associated with the selected rate tier associated with the selected vendor; iii) determines a transaction fee to apply to the payment, the transaction fee being a product of the amount of the payment and the transaction rate associated with the selected rate tier associated with the selected vendor—adjusted for a minimum and/or maximum fee; and iv) initiates payment, to an account of the selected vendor, a net amount equal to the payment less the first transaction fee. Initiation of payment of the net amount may be by way of: i) a credit in the amount of the payment less the transaction fee (i.e. short pay); or ii) a combination of a credit in the amount of the payment and a corresponding debit from the account of the selected vendor in the amount of the transaction fee.

BRIEF DESCRIPTION OF THE DRAWINGS

FIG. 4*a* is a table diagram representing data elements stored in, and relationships between data elements stored in, a vendor registry in accordance with an exemplary embodiment of the present invention;

FIG. 4*b* is a table diagram representing a matching of sensitivity scores to industry codes in accordance with an exemplary embodiment of the present invention;

FIG. 4*c* is a table diagram representing weight factors to apply to in accordance with an exemplary embodiment of the present invention;

FIG. 4*d* is a table diagram representing payer centric spend scores and criteria for determining a payer centric spend score in accordance with an exemplary embodiment of the present invention;

FIG. 4*e* is a table diagram representing payer centric frequency scores and criteria for determining a payer centric frequency score in accordance with an exemplary embodiment of the present invention;

FIG. 4*f* is a table diagram representing network spend scores and criteria for determining a network spend score in accordance with an exemplary embodiment of the present invention;

FIG. 4*g* is a table diagram representing network frequency scores and criteria for determining a network frequency score in accordance with an exemplary embodiment of the present invention;

FIG. 5 is a table diagram representing data elements stored in, and relationships between data elements stored in, a payer registry in accordance with an exemplary embodiment of the present invention;

FIG. 7*a* is a table diagram representing data elements stored in, and relationships between data elements stored in, a payment file in accordance with an exemplary embodiment of the present invention;

FIG. 7*b* is a table diagram representing data elements stored in, and relationships between data elements stored in, a payment file in accordance with an exemplary embodiment of the present invention;

FIG. 7*c* is a table diagram representing data elements stored in, and relationships between data elements stored in, a payment file in accordance with an exemplary embodiment of the present invention;

DETAILED DESCRIPTION OF THE INVENTION

Figure 1:
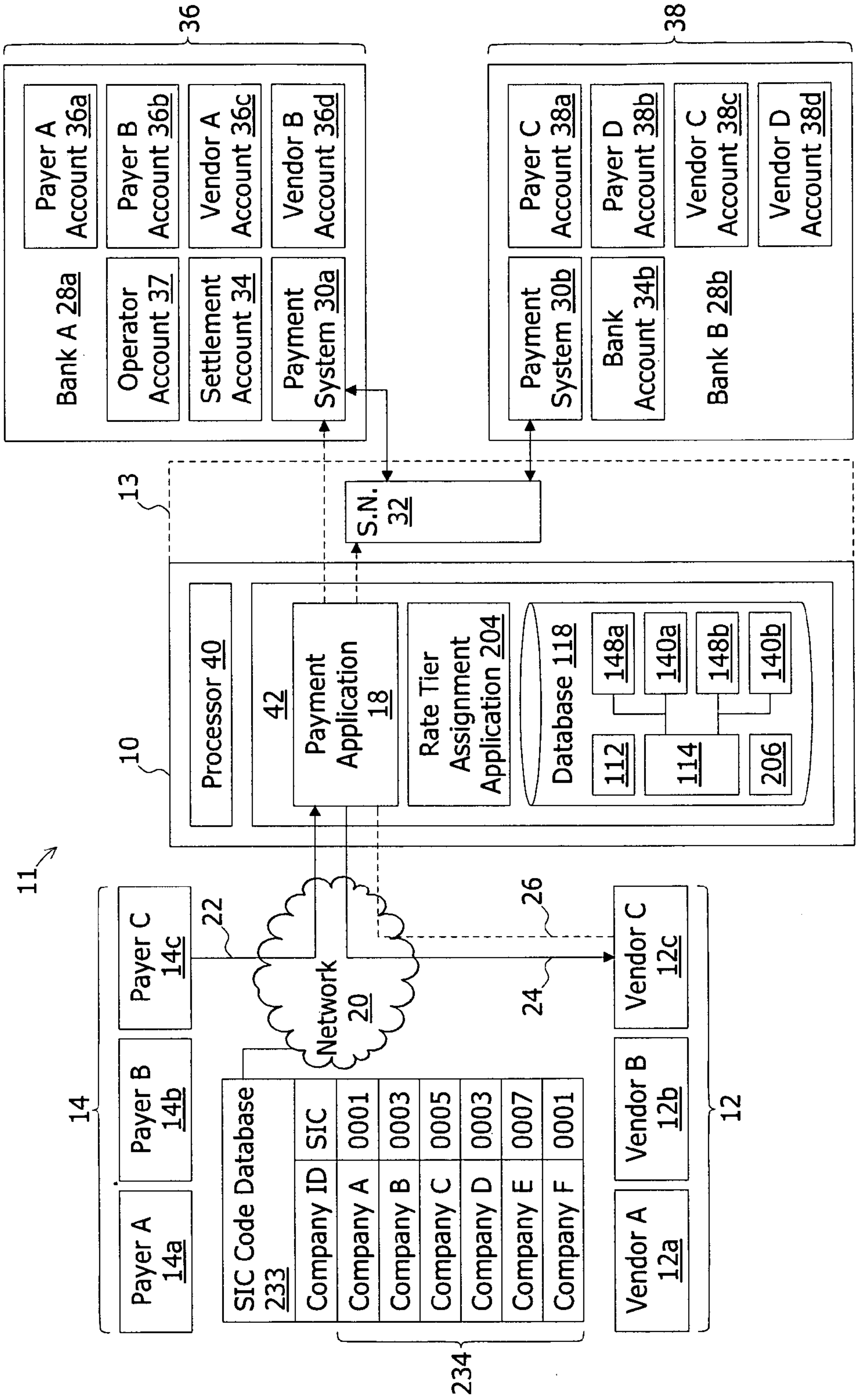
FIG. 1 is a block diagram representing architecture of a system for making payments from each payer of a community of payers to each vendor of a community of vendors assesses a variable transaction fee to each vendor, all in accordance with an exemplary embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code/instructions which is encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that table structures represented in this application are exemplary data structures only and intended to show the mapping of relationships between various data elements. Other table structures may store similar data elements in a manner that maintains the relationships useful for the practice of the present invention.

Within this application the applicant has depicted and described groups of certain elements. As used in this application, the term group means at least three of the elements. For example, a group of vendors means at least three vendors. When a group, for example a first group, is referred to as being distinct, or distinct from a second group, it means that the first group contains at least one element that is not present in the second group and the second group includes at least one element that is not present in the first group. The use of the term unique with respect to an element within a group or set of elements means that that the element is different then each other element in the set or group.

Within this application, the applicant has used the term database to describe a data structure which embodies groups of records or data elements stored in a volatile or non volatile storage medium and accessed by an application, which may be instructions coded to a storage medium and executed by a processor. The application may store and access the database.

Turning to FIG. 1, an exemplary architecture 11 is shown in which a payment bureau 10 executes payments from each payer 14*a*, 14*b*, 14*c* of a community of payers 14 to each vendor 12*a*, 12*b*, 12*c* of a community of vendors 12, assessing a transaction fee to each vendor in conjunction with executing a payment from a payer to the vendor, and providing a variable rebate to the payer.

The transaction fee assessed to the vendor is based on a variable transaction rate. More specifically, the fee is the product of multiplying the amount of the payment by the rate that is applicable to payments made by the particular payer to the particular vendor. The rate is referred to as "variable" because: i) the rate is variable amongst vendors, the same payer may use different rates for different vendors; and ii) the rate is variable amongst payers, the same vendor may be subjected to different rates, based on the particular payer making the payment.

The system 10 is communicatively coupled to each payer 14*a*, 14*b*, 14*c* of the community of payers 14 and to each vendor 12*a*, 12*b*, 12*c* of the community of vendors 12 via an open network 20 such as the public internet.

Figure 2:
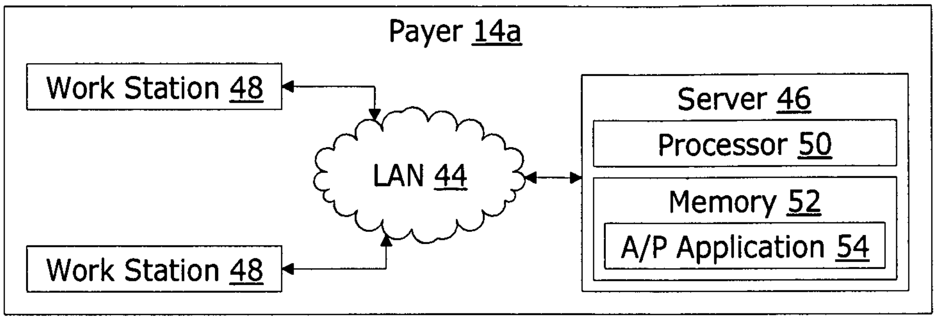
FIG. 2 is a block diagram representing a payer in accordance with an exemplary embodiment of the present invention.

Turning briefly to FIG. 2 in conjunction with FIG. 1, in an exemplary embodiment, each payer, using payer 14*a* for example, may be a business that includes at least one computer system or server 46. The computer system(s) or server (s) 46 include at least one processor 50 and associated memory 52 programmed with an accounts payable application 54.

In a typical environment, the computer system(s) or server (s) 46 operating the accounts payable application 54 may be coupled to a local area network 44 and accessed by entitled users of workstations 48 and may be used for managing the payer's accounts payables and issuing payments to its vendors.

Figure 3:
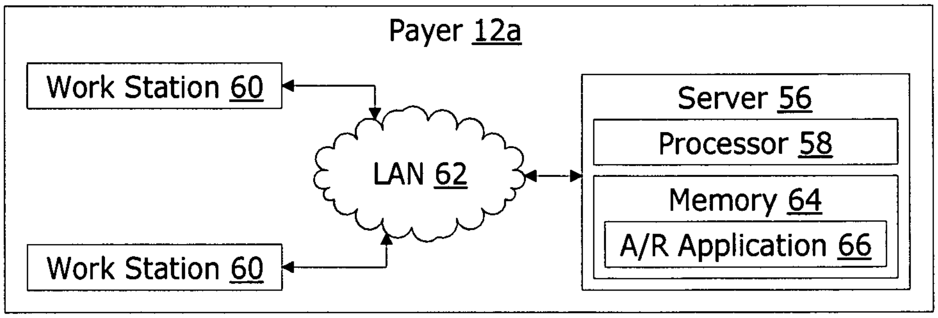
FIG. 3 is a block diagram representing a payer in accordance with an exemplary embodiment of the present invention.

Turning briefly to FIG. 3 in conjunction with FIG. 1, in an exemplary embodiment, each vendor, using vendor 12*a* for example, may be a business that includes at least one computer system or server 56. The computer system(s) or server (s) 56 include at least one processor 58 and associated memory 64 programmed with an accounts receivable application 66.

In a typical environment, the computer system(s) or server (s) 56 operating the accounts receivable application 66 may be coupled to a local area network 62 and accessed by entitled users of workstations 60 and may be used for managing the vendor's accounts receivables and reconciling payments issued by customers (i.e. payers) against amounts due to the vendor.

Returning to FIG. 1, for purposes of illustrating the invention, at least two banks 28*a* and 28*b* are represented. Each bank, for example bank 28*a*, may include a payment system 30*a* (i.e. instructions coded to a computer readable medium and executed by a processor) which manages deposit accounts 36, including execution of credit and debit transactions to deposit accounts 36 in a traditional manner. Similarly bank 28*b* may include a payment system 30*b* (i.e. instructions coded to a computer readable medium and executed by a processor) which manages deposit accounts 38, including execution of credit and debit transactions to deposit accounts 38 in a traditional manner.

The payment system 30*a*, 30*b* of each bank 28*a*, 28*b* may further be coupled to a settlement network 32 which transfers funds between banks for settlement of payments between accounts a different banks. Exemplary settlement networks include the National Automated Clearing House Association (NACHA) for settling ACH transactions and Federal Reserve for settling wire transactions. The settlement network may also be a bank card association, such as associations known as Visa or MasterCard, which settles payments typically referred to as card payments.

Each bank may include, and each banks payment system 30*a*, 30*b* may also manage, multiple customer accounts 36 (for bank 28*a*) and 38 (for bank 28*b*). Each customer account is an account to which credit and debit transactions are posted representing credits and debits to the funds of a particular customer associated with the account (i.e. the account holder).

For example, bank 28*a* may have a customer account 36*a* for Payer 14*a*, a customer account 36*b* for payer 14*b*, a customer account 36*c* for vendor 12*a*, a customer account 36*d* for vendor 12*b*.

For example, bank 28*b* may have a customer account 38*a* for Payer 14*c*, a customer account 38*b* for payer 14*d*, a customer account 38*c* for vendor 12*c*, a customer account 38*d* for vendor 12*d*.

Each customer account for a payer may be a deposit account such as a commercial checking account. Each customer account for a vendor may be a deposit account such as a commercial checking account or a merchant services account such as an account funded upon settlement of a card payment transaction.

For purposes of illustrating this invention, bank 28*a* may further include, and the banks' payment system 30*a* may further manage, an operator account 37 which may be a deposit account, such as a commercial checking account, to which credits and debit transactions are posted representing credits and debits to funds of the operator of the system 10.

For purposes of illustrating this invention, bank 28*a* may further include, and the banks' payment system 30*a* may further manage, a settlement account 34 which may be a fiduciary consolidation account, such as a commercial checking account, to which credits and debit transactions are posted representing credits to fund payments to be issued by payers and debits to disburse payment to vendors.

In an exemplary embodiment, the payment bureau 10 may be communicatively coupled to at least one payment system of at least one bank, for example payment system 30*a* of bank 28*a*. This may be the payment system 30*a* which manages the operator account 37 and the settlement account(s) 34.

In another exemplary embodiment, the system 10 may further be coupled to the settlement network 32, or may alternatively be coupled to the settlement network 32 in lieu of being coupled to a payment system 30*a* of a bank 28*a*.

In yet another exemplary embodiment, the settlement network may be part of the payment bureau 10 as depicted by the dashed line 13 in FIG. 1. For example, if the payment bureau 10 is operated by a bank card association the payment bureau 10 may include a proprietary settlement network 32.

The payment bureau 10 may be a computer system of one or more servers comprising at least a processor 40 and computer readable medium 42. The computer readable media may include encoded thereon a payment application 18, a rate tier assignment application 204, and database 118. Each of the payment application 18 and rate tier assignment application 204 may be a computer program comprising instructions embodied on computer readable medium 42 and executed by the processor 40. The database 118 may include data structures, also referred to as tables, as described herein.

Referring to FIG. 4*b* in conjunction with FIG. 1, the database 118 may include, as one of its data structures, sensitivity score table 206. The sensitivity score table 206 may associate each industry code of a group of industry codes 208 to a sensitivity score 210. The group of industry codes 208 may be the four digit Standard Industrial Classification (SIC) code promulgated by the US Government; the six digit North American Industry Classification System (NAICS) code promulgated by the US Government, or the codes of any other industry classification system which utilizes alpha numeric characters or other code values to classify industries and commercial activities.

The sensitivity score 201 assigned to each industry code may be one of a group of discrete score values such as score values 1, 2, 3, 4, and 5 which represents how sensitive typical participants in such industry are to a fee charge related to receipt of payments. This measure or sensitivity may be determined based on evaluations of historical information related to industry participants accepting fees or other empirical evaluations or methods of study.

Turning briefly to FIG. 4*a* in conjunction with FIG. 1, the database 118 may further include, as one of the data structures, a vendor registry 112. The vendor registry 112 may comprise a group of vendor records 128. The group of vendor records 128 may comprise unique records, each of which is associated with, and identifies, a unique one of the vendors of the community of vendors 12 by inclusion of a unique vendor ID within a vendor ID field 130 of the record.

Also associated with the vendor may be: i) the vendors name included in a name field 132; ii) the vendor's tax identification number included in a tax ID field 134; iii) the vendor's industry code 135; iv) the vendor's contact information included in a contact information field 136; v) the vendors remittance address included in a remittance address field 138; and vi) the vendors remittance account information included in a remittance account information field 140.

The vendor's name 132 may be the official name of the entity as recorded in official records of the jurisdiction in which it is formed and as used for titling its bank accounts, including its remittance account.

The vendor's industry code 135 may be the code of the group of industry codes 208 which represents the industry or commercial activity in which the vendor participates.

The vendor's remittance address 138 may be an address the vendor typically uses for receiving checks from its customers by regular mail (for example a lock box address).

The vendor's contact information 136 may include the name of an individual in the vendor's accounts receivable department responsible for managing the vendor's accounts receivable matters with the payers 22.

The vendor's remittance account information 140 may include bank account information (such as routing number and account number) and/or other information needed by the payment bureau to execute deposits to the vendor in accordance with payment authorization instructions provided by a payer.

Turning to FIG. 5 in conjunction with FIG. 1, the database 118 may include, as one of the data structures, a data structure 115 which includes, for each payer 14*a*, 14*b*, 14*c* within the community of payers 14, identification of the payer and, in association with identification of the payer, identification of the payer's unique payer vendor subgroup, a rate tier associated with each vendor in the payer vendor subgroup, and payer specific transaction rates associate with each rate tier.

The payer's unique payer vendor subgroup is the group of vendors to which the payer makes payment using the payment bureau 10. The payer's payer vendor subgroup may be a subset of the community of vendors 12 that consists of fewer than the entire community of vendors and is distinct from each of the other payer's unique payer vendor subgroup.

More specifically, the data structure 115 may include a payer registry 114. The payer registry 114, may comprise a group of payer records 120. Each record 120 is associated with, and identifies a unique one of the payers 14*a*, 14*b*, 14*c* of the community of payers 14 by inclusion of a unique payer ID within a payer ID field 122 of the record.

Also associated with each payer is funding information unique to the payer and stored in at least one funding information field 124 of the record. The funding information may include bank account information (which may be a routing number and account number) identifying a bank deposit account belonging to the payer and/or other information used by the payment bureau 10 to execute payments from the account belonging to the payer to an account associated with a vendor within the payer's vendor subgroup in accordance with payment authorization instructions provided by the payer.

Each record of the payer registry 114 may be associated with a unique transaction rate table 148 and a unique payer vendor group table 140, for example the record for payer 14*a* (with payer ID "Payer A") may be associated with transaction rate table 148*a* and payer vendor group table 140*a* and the record for payer 14*b* (with payer ID "Payer B" may be associated with transaction rate table 148*b* and payer vendor group table 140*b*.

The transaction rate table 148*a* may include a group of records 154. Each record may associate a unique transaction rate tier identifier (within a transaction rate tier field 150) with a unique transaction rate (within a transaction rate field 152) which may be a percentage of the amount of the transaction.

Payer vendor group table 140*a*, associated with payer 14*a*, may include identification of payer 14*a*, and a vendor ID for each vendor in Payer 14*a*'s unique payer vendor subgroup. More specifically, the payer vendor group table 140*a* may include a group of records 142*a* with each record being unique to one of the vendor's within payer 14*a*'s payer vendor subgroup.

Each record 142*a* may include a vendor ID within a vendor ID field 144*a* which identifies the vendor and associates the record with the vendor. For example, payer 14*a*'s payer vendor subgroup may consists of six (6) vendors, vendor 12*a*, vendor 12*b*, vendor 12*c*, vendor 12*e*, vendor 12*g*, and vendor 12*i*, which is fewer then all vendors within the community of vendors 12.

The payer suppler group table 140*a* also associates each suppler with a transaction rate tier identifier used to determine a transaction rate that applies to payments from Payer 14*a* to the vendor. More specifically, a transaction rate tier identifier (corresponding to one of the transaction rate tier identifiers from a record of the transaction rates table 148*a*) may be within a transaction rate tier field 146*a* of the record 142*a* associated with the vendor.

For example, identification of first transaction rate tier (Tier_1) is associated with identification of Vendor 12*a* indicating that a first transaction rate applies to payments from Payer 14*a* to Vendor 12*a*. A second transaction rate tier (Tier_2) is associated with identification of Vendor 12*b*, a third transaction rate tier (Tier_3) is associated with identification of Vendor 12*c*, and Vendor 12*e*, a fourth transaction rate tier (Tier_4) is associated with identification of Vendor 12*g*, and a fifth transaction rate tier (Tier_6) is associated with identification of vendor 12*i*.

With respect to payer 14*b*, the transaction rate table 148*b* may include a group of records 154. Each record may associate a unique transaction rate tier identifier (within a transaction rate tier field 150) with a unique transaction rate (within a transaction rate field 152). Note that the transaction rates associated with each Tier 1-5 in table 148*b* (applicable to payments made by payer 14*b*) may be distinct from the transaction rates associated with the corresponding tier on table 148*a* (applicable to payments made by payer 14*a*).

Payer 14*b*'s payer vendor subgroup may consists of six (6) vendors, vendor 12*a*, vendor 12*b*, vendor 12*c*, vendor 12*f*, vendor 12*h*, and vendor 12*j*, which is fewer then all vendors within the community of vendors 12. Within the vendor group table 140*b*, each of such vendors is associated with a unique record that includes the Vendor ID within the vendor ID field 114*b*.

The payer suppler group table 140*b* also associates each suppler with a transaction rate tier that applies to payments from Payer 14*b* to the vendor. More specifically, a transaction rate tier identifier (corresponding to one of the transaction rate tier identifiers from a record of the transaction rates table 148*b*) may be within a transaction rate tier field 146*b* of the record 142*b* associated with the vendor.

For example, identification of first transaction rate tier (Tier_1) is associated with identification of Vendor 12*a* indicating that a first transaction rate applies to payments from Payer 14*b* to Vendor 12*a*, a second transaction rate tier (Tier_2) is associated with identification of Vendor 12*b*, a third transaction rate tier (Tier_3) is associated with identification of Vendor 12*c*, the fourth transaction rate tier (Tier_5) is associated with identification of Vendor 12*f* and Vendor 12*h*, and a fifth transaction rate tier (Tier_4) is associated with identification of vendor 12*j*.

It should be appreciated that, within each payer's payer vendor subgroup, each vendor in each subgroup is different from each suppler in each other subgroup. Stated another way, no vendor is within multiple subgroups of any payer's payer vendor subgroup.

Figure 6:
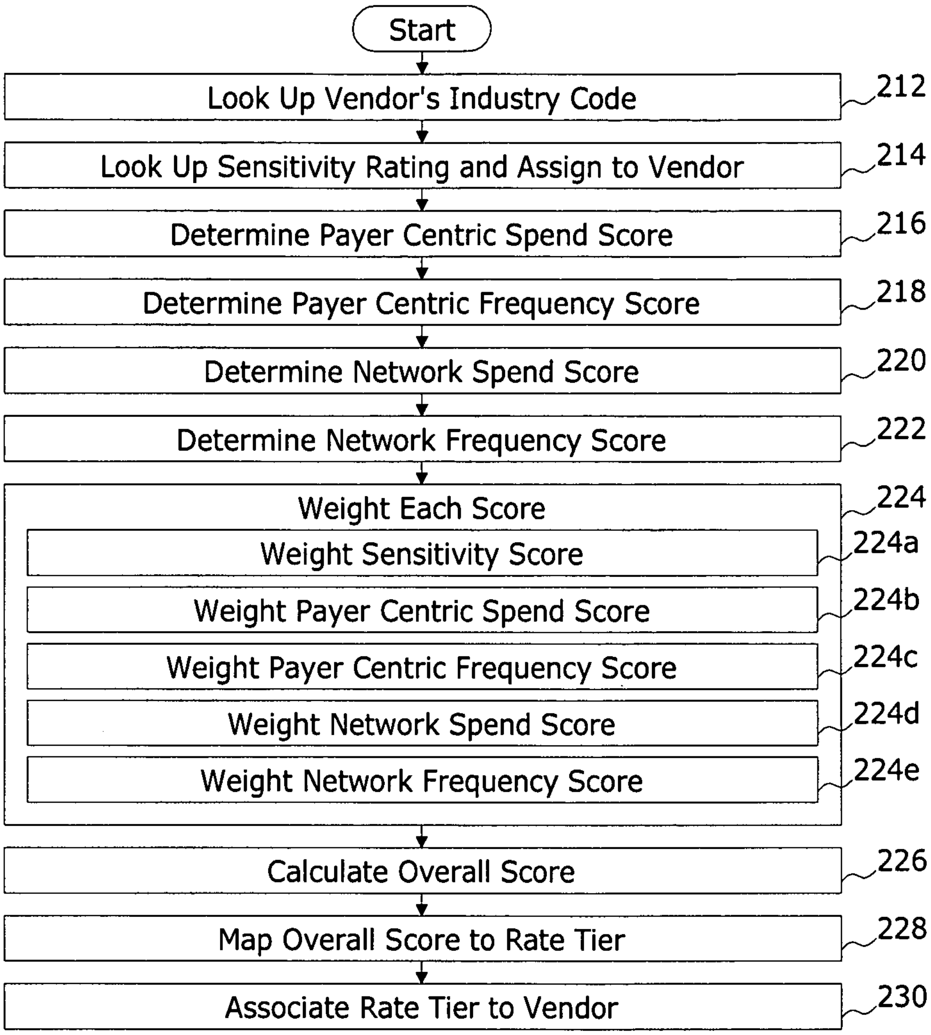
FIG. 6 is a flow chart representing operation of an initial fee tier assignment application in accordance with the present invention.

An initial rate tier may be assigned to each vendor by the rate tier assignment application 204 (FIG. 1). Turning to FIG. 6, exemplary steps performed by the rate tier assignment application 204 to assign an initial rate tier to a vendor are shown.

Step 212 represents determining the vendor's industry code. The rate tier assignment application 204 may determine the vendor's industry code by retrieving it from the industry code field 135 of the record associated with the vendor in the vendor registry 112 (FIG. 4). Alternatively, with reference to FIG. 1 in conjunction with FIG. 4, if the vendor's industry code is not available in the vendor registry 112, the rate tier assignment application 204 may query a SIC code database 232.

The SIC code database 232 may associate the name of each company within a group of companies 234 with the company's industry code. Each company may be identified by its name, tax ID number, or other identifier. In querying the SIC code database 232, the rate tier assignment application may provide the vendor's name, tax ID number, or other identifier and receive, in response, the vendors industry code.

The SIC database 233 may be a remote database accessible over the internet 20 as depicted in FIG. 1, a local database coupled to the system 10, or a local database that is part of database 118 of system 10.

Returning to FIG. 6, step 214 represents determine the vendor's industry sensitivity score by looking up the industry sensitivity score 236 associated with the vendor's industry code in the sensitivity score table 206 (FIG. 4*b*).

Step 216 represents determining the vendor's payer centric spend score. The vendor's payer centric spend score is a function of the aggregate value of all payments expected to be made by a particular payer, for example payer 14*a*, to the vendor over a predetermined period of time, such as one calendar year and may be an integer value of one (1) through five (5).

The aggregate amount of payments expected to be made by the particular payer to the vendor over the one year period may be determined based on historical payment information, such as the aggregate amount of payments made by the particular payer to the vendor over the previous year.

Referring briefly to FIG. 4*d* in conjunction with FIG. 1, in an exemplary embodiment, the rate tier assignment application 204 may maintain a payer centric spend table 240 which includes a record 242 associated with each score value 1-5. The record designates criteria for assigning the score value. In the exemplary embodiment: i) a score value of 1 is assigned if the aggregate amount of payments expected to be made by the particular payer to the vendor over a one year period is less than or equal to $5,000; ii) a score value of 2 is assigned if the aggregate amount of payments expected to be made by the particular payer to the vendor over a one year period is between $5,001 and $10,000; iii) a score value of 3 is assigned if the aggregate amount of payments expected to be made by the particular payer to the vendor over a one year period is between $10,001 and $15,000; iv) a score value of 4 is assigned if the aggregate amount of payments expected to be made by the particular payer to the vendor over a one year period is between $15,001 and $50,000; and v) a score value of 5 is assigned if the aggregate amount of payments expected to be made by the particular payer to the vendor over a one year period is greater than $50,000.

Step 218 represents determining the vendor's payer centric frequency score. The vendor's payer centric frequency score is a function of the quantity of payments expected to be made by a particular payer, for example payer 14*a*, to the vendor over a predetermined period of time, such as one calendar year and may be may be an integer value of one (1) through five (5).

The total quantity of payments expected to be made by the particular payer to the vendor over the one year period may be determined based on historical payment information, such as the total quantity of payments made by the particular payer to the vendor over the previous year.

Referring briefly to FIG. 4*e* in conjunction with FIG. 1, in an exemplary embodiment, the rate tier assignment application 204 may maintain a payer centric frequency table 244 which includes a record 246 associated with each score value 1-5. The record designates criteria for assigning the score value. In the exemplary embodiment: i) a score value of 1 is assigned if the total quantity of payments expected to be made by the particular payer to the vendor over a one year period is no greater than one (1); ii) a score value of 2 is assigned if the total quantity of payments expected to be made by the particular payer to the vendor over a one year period is two (2) to three (3); iii) a score value of 3 is assigned if the total quantity of payments expected to be made by the particular payer to the vendor over a one year period is between four (4) and ten (10); iv) a score value of 4 is assigned if the total quantity of payments expected to be made by the particular payer to the vendor over a one year period is between eleven (11) and fifteen (15); and v) a score value of 5 is assigned if the total quantity of payments expected to be made by the particular payer to the vendor over a one year period is greater than fifteen (15).

Step 220 represents determining the vendor's network spend score. The vendor's network spend score is a function of the aggregate value of all payments expected to be made by all payers within the group of payers 14 to the vendor over a predetermined period of time, such as one calendar year and may be may be an integer value of one (1) through five (5).

The aggregate amount of payments expected to be made to the vendor by multiple payers within the network of payers over the one year period may be determined based on historical payment information, such as the aggregate amount of payments made to the vendor by multiple payers within the network of payers over the previous year.

Referring briefly to FIG. 4*f* in conjunction with FIG. 1, in an exemplary embodiment, the rate tier assignment application 204 may maintain a network spend table 248 which includes a record 250 associated with each score value 1-5. The record designates criteria for assigning the score value. In the exemplary embodiment: i) a score value of 1 is assigned if the aggregate amount of payments expected to be made to the vendor by multiple payers within the network of payers over a one year period; divided by the number of payers making payment to the vendor to derive a "per payer average" results in a per payer average less than or equal to $5,000; ii) a score value of 2 is assigned if the aggregate amount of payments expected to be made to the vendor by multiple payers within the network of payers over a one year period results in a per payer average between $5,001 and $10,000; iii) a score value of 3 is assigned if the aggregate amount of payments expected to be made to the vendor by multiple payers within the network of payers over a one year period results in a per payer average between $10,001 and $15,000; iv) a score value of 4 is assigned if the aggregate amount of payments expected to be made to the vendor by multiple payers within the network of payers over a one year period results in a per payer average between $15,001 and $50,000; and v) is assigned if the aggregate amount of payments expected to be made to the vendor by multiple payers within the network of payers over a one year period results in a per payer average greater than $50,000.

Step 222 represents determining the vendor's network centric frequency score. The vendor's network frequency score is a function of the totally quantity of payments expected to be made by all payers within the group of payers 14 to the vendor over a predetermined period of time, such as one calendar year and may be may be an integer value of one (1) through five (5).

The total quantity of payments expected to be made to the vendor by multiple payers within the network of payers over the one year period may be determined based on historical payment information, such as the total quantity of payments made to the vendor by multiple payers within the network of payers over the previous year.

Referring briefly to FIG. 4*e* in conjunction with FIG. 1, in an exemplary embodiment, the rate tier assignment application 204 may maintain a network frequency table 252 which includes a record 254 associated with each score value 1-5. The record designates criteria for assigning the score value. In the exemplary embodiment: i) a score value of 1 is assigned if the total quantity of payments expected to be made to the vendor by multiple payers within the network of payers; divided by the number of payers making payment to the vendor to result in a "per payer average" results in a per payer average of one (1); ii) a score value of 2 is assigned if the total quantity of payments expected to be made to the vendor by multiple payers within the network of payers results in a per payer average of two (2) to three (3); iii) a score value of 3 is assigned if the total quantity of payments expected to be made to the vendor by multiple payers within the network of payers results in a per payer average of four (4) and ten (10); iv) a score value of 4 is assigned if the total quantity of payments expected to be made to the vendor by multiple payers within the network of payers results in a per payer average of eleven (11) and fifteen (15); and v) a score value of 5 is assigned if the total quantity of payments expected to be made to the vendor by multiple payers within the network of payers results in a per payer average of sixteen (16) or greater. In all cases fractional values may be rounded to the nearest integer value, rounded up to the nearest integer value, or rounded down (i.e. truncated) to the nearest integer value.

Returning to FIG. 6, step 224 represents weighting each score. Referring to the weighting table of FIG. 4*c*, each score, as determined at steps 214 through 222 is multiplied by a weight factor 238 to determine a weighted score.

More particularly, at step 224*a*, the sensitivity score is weighted (or multiplied by) a factor of 1.0 to determine a weighted industry sensitivity score.

At step 224*b* the payer centric spend score is weighted by a factor of 0.65 to determine a weighted payer centric spend score. Provided however, in the event the payer centric spend score is greater than four (4) and the payer centric frequency score is less than two (2), the payer centric spend score is weighted by a factor of 0.2 to determine the weighted payer centric spend score.

At step 224*c* the payer centric frequency score is weighted by a factor of 0.85 to determine a weighted payer centric frequency score.

At step 224*d* the network spend score is weighted by a factor of 0.75 to determine a weighted network spend score. Provided however, in the event the network spend score is greater than four (4) and the network frequency score is less than two (2), the network spend score is weighted by a factor of 0.2 to determine the weighted network spend score.

At step 224*e* the network frequency score is weighted by a factor of 0.95 to determine a weighted network frequency score.

It should be appreciated that each weight factor may be distinct from other weight factors Step 226 represents calculating an overall score. The overall score is the average of the weighted industry sensitivity score, the weighted payer centric spend score, the weighted payer centric frequency score, the weighted network spend score, and the weighted network frequency score.

Step 228 represents determining the rate tier to initially assign to the vendor by mapping the overall score to one of the rate tiers. Examples of how the mapping may be performed include: i) rounding the overall score to the closest rate tier value, for example overall score of 2.51 maps to rate Tier_3; and ii) truncating the overall score to the closest rate tier value, for example overall score of 2.51 maps to rate Tier_2.

Step 230 represents associating the rate tier with the vendor by writing the rate tier in association with the vendor in the payer vendor subgroup table 140 associated with the payer that was used for determining the payer centric spend score and the payer centric frequency score.

It should be appreciated that the steps represented by FIG. 6 represent the exemplary embodiment wherein the overall score and the rate tier assigned to the vendor are a function of all of the vendor's industry score, payer centric spend score, payer centric frequency score, network spend score, and network frequency score. The scope of the present invention includes determining the overall score and rate tier assignment as a function of permutations of one or more of any of these scores.

For example, determining the rate tier based on: i) industry score only (permutation of only one score), ii) industry score, payer centric spend score, and payer centric frequency score (permutation of three scores); and iii) industry score, network spend score, and network frequency score (a different permutation of three scores). When permutations of fewer than all scores are used, the weighted average is based on only those scores that are used.

Making Payments

Turning to FIG. 1, in operation, the payment bureau 10 processes payments, each payment being initiated by one of the payer's within the community of payers 14, for payment of a payment amount from the payer's account to one of the vendors within the community of vendors 12. More specifically, from each payer 14*a*, 14*b*, 14*c* of the community of payers 14, the payment bureau 10 receives a payment instruction file identifying payments to process for the payer. For example, arrow 22 represents receipt of a payment instruction file from payer 14*c* identifying payments to process for payer 14*c*, the payments being payments to a group of vendor's within the payer 14*a*'s payer vendor subgroup.

Referring to FIG. 7*a* a first exemplary payment instruction data structure, or payment instruction file is depicted. Referring to FIG. 1 in conjunction with FIG. 7*a*, the payment file 160*a* may comprises identification of the payer within a payer ID field 162 (Payer ID "Payer A" representing payer 14*a*) and, associated with that payer ID field 152, a group of unique records 172, each record representing a unique payment instruction. Each record 172 includes: i) identification of the vendor to which payment is to be made by inclusion of the vendor's Vendor ID (from the vendor registry 112) within a vendor ID field 164; ii) identification of the amount of the payment to be made to the vendor by inclusion of a payment amount within a payment amount field 166; and iii) remittance information, which may be alpha numeric information identifying what payable is being paid, within a remittance string field 170. The remittance information may identify the vendor's invoice being paid, goods or services for which payment is being made, or other aspects of an underlying transaction between the payer and vendor giving rise to the payment associated with the record.

FIG. 7*b* represents a second exemplary payment instruction data structure, or payment instruction file. Referring to FIG. 1 in conjunction with FIG. 7*b*, the payment file 160*b* may comprise a group of unique records 172, each record representing a unique payment instruction. Each record 172 includes: i) identification of the payer within a payer ID record 162 (i.e. Payer ID "Payer B" representing payer 14*b*)); ii) identification of the vendor to which payment is to be made by inclusion of the vendor's Vendor ID (from the vendor registry 112) within a vendor ID field 164; iii) identification of the amount of the payment to be made to the vendor by inclusion of a payment amount within a payment amount field 166; and iv) remittance information, which may be alpha numeric information identifying what payable is being paid, within a remittance string field 170. Again, the remittance information may identify the vendor's invoice being paid, goods or services for which payment is being made, or other aspects of an underlying transaction between the payer and vendor giving rise to the payment associated with the record.

FIG. 7*c* represents a third exemplary payment instruction data structure, or payment instruction file. Referring to FIG. 1 in conjunction with FIG. 7*c*, a group of independent payment instructions, comprising unique payment instructions 161*a*, 161*b* and 161*c*, may in the aggregate be a payment instruction file 160*c*.

Each payment instruction may include: i) identification of the payer within a payer ID record 162; ii) identification of the vendor to which payment is to be made by inclusion of the vendor's Vendor ID (from the vendor registry 112) within a vendor ID field 164; iii) identification of the amount of the payment to be made to the vendor by inclusion of a payment amount within a payment amount field 166; and iv) remittance information, which may be alpha numeric information identifying what payable is being paid, within a remittance string field 170. Again, the remittance information may identify the vendor's invoice being paid, goods or services for which payment is being made, or other aspects of an underlying transaction between the payer and vendor giving rise to the payment associated with the record.

Figure 8A:
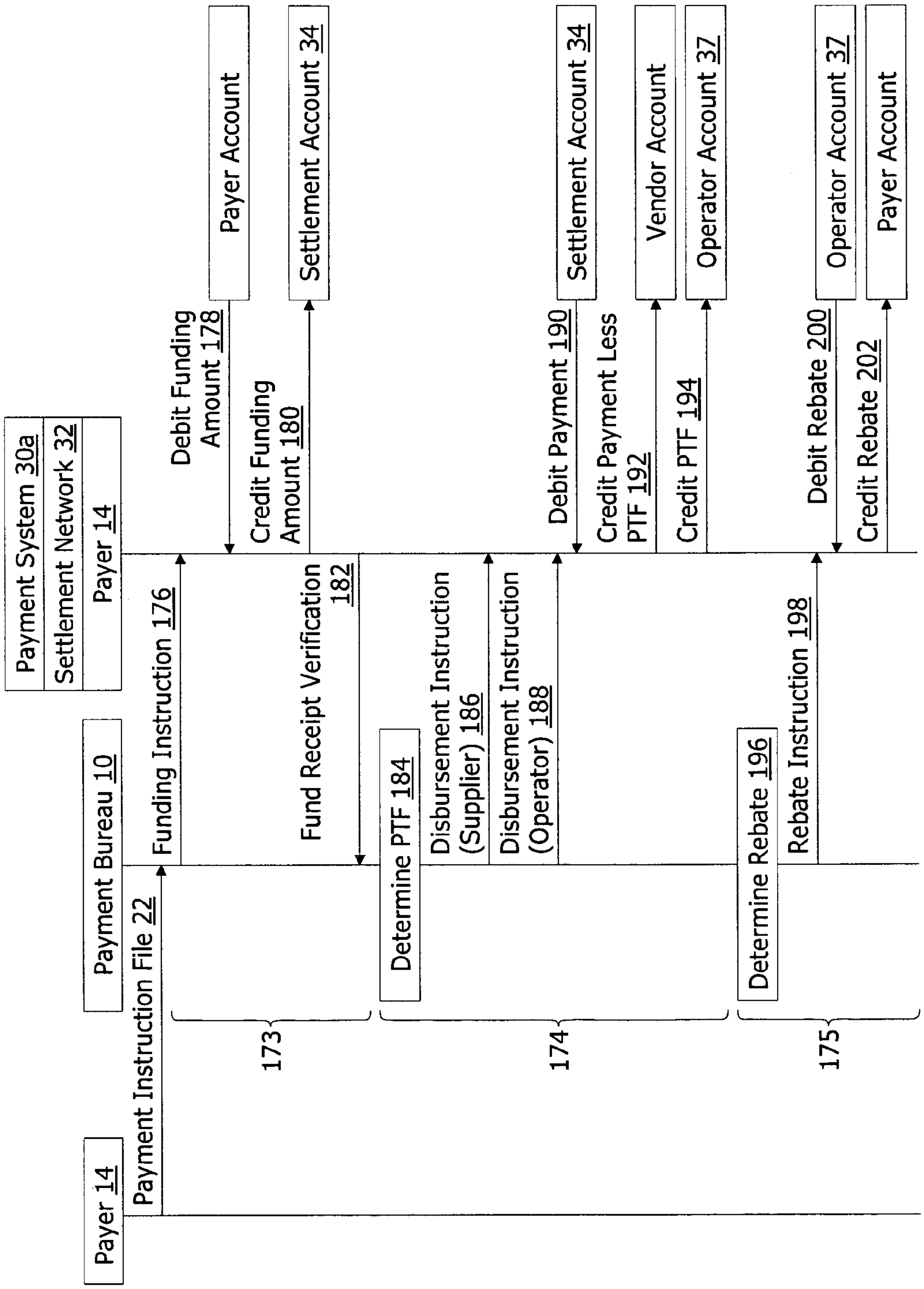
FIG. 8*a* is a ladder diagram representing a combination of data structures and instructions stored in memory and executed by a processor for making payments from each payer of a community of payers to each vendor of a community of vendors assesses a variable transaction fee to each vendor, all in accordance with an exemplary embodiment of the present invention.

Referring to the ladder diagram of FIG. 8*a* in conjunction with FIG. 1, in an exemplary embodiment of operation, the payment bureau 10 receives a payment file, for example payment file 160*a* (FIG. 7*a*) from payer 14*a*, as represented by step 22. The payment instruction file may be transferred via a secure connection over the network 20 which may include implementing encryption of the connection and/or the file transferred over the connection.

Upon receiving and authenticating the payment file 160, the payment bureau 10, or more specifically, the processor 40 executing the payment application 18, performs funding steps 173 to transfer a funding amount equal to the aggregate or sum of the amount of all payments in the payment file 160 from the payer's account (account 36*a* at bank 28*a*) to the settlement account 34.

The funding steps 173 may include generating a funding instruction 176 to the payment system 30*a* to which the payment bureau 10 is coupled. The funding instruction 176 may include initiation of a debit transaction to debit the funding amount from the payer's transaction account (account 36*a*) as represented by step 178 and a credit transaction to credit to the settlement account 34 the funding amount as represented by step 180. The funding steps 173 may further include the payment system 30*a* providing a message back to the payment bureau verifying that the funding amount has been received in the settlement account 34.

The debit of the payer's account and credit to the settlement account may be by funds transfer if both accounts are held at the same bank, by transfer through a settlement network 32 (for example via ACH or Wire) if the payers account and settlement account are held at different banks.

In a second funding embodiment, the funding instruction 176 may be an instruction, or a debit/credit instruction pair, sent directly by the payment application 18 to the settlement network 32 to effect the initiation of a debit transaction to debit the funding amount from payer's account (account 36*a*) as represented by step 178 and initiation of a credit transaction to credit to the settlement account 34 the funding amount as represented by step 180.

As discussed, the settlement network 32 may be separate from the payment bureau 10, such as the Fedwire settlement network or the ACH settlement network, or may be a proprietary component of the payment bureau 10, such as a bank card association settlement network. In an embodiment wherein the settlement network 32 is part of the payment bureau 10, the settlement network 32 may be an application comprising instructions stored on the computer readable medium 42 and executed by processor 40, such instructions implementing the credit and debit transactions as described in this specification.

In a third funding embodiment, the funding instruction 176 may be a message to the payer from which the payment file was received. The payer may then, accessing a payment system 30 at the payer's bank or a settlement network, initiate a debit transaction to debit the funding amount from payers account (account 36*a*) as represented by step 178 and initiation of a credit transaction to credit to the settlement account 34 the funding amount as represented by step 180. The message to the payer may simple be a message acknowledging receipt of the payment file.

In both the second funding embodiment and the third funding, the verification of receipt of the funding amount in the settlement account 34 may be a message to the payment bureau 10 that is generated by the bank at which the settlement account 34 is held.

After the funding amount is received in the settlement account 34, disbursement steps 174 are performed for each payment represented in the payment file. In executing the disbursement steps 174 for a payment, the payment bureau 10 identifies a payment transaction fee to apply to the payment at step 184.

Figure 9:
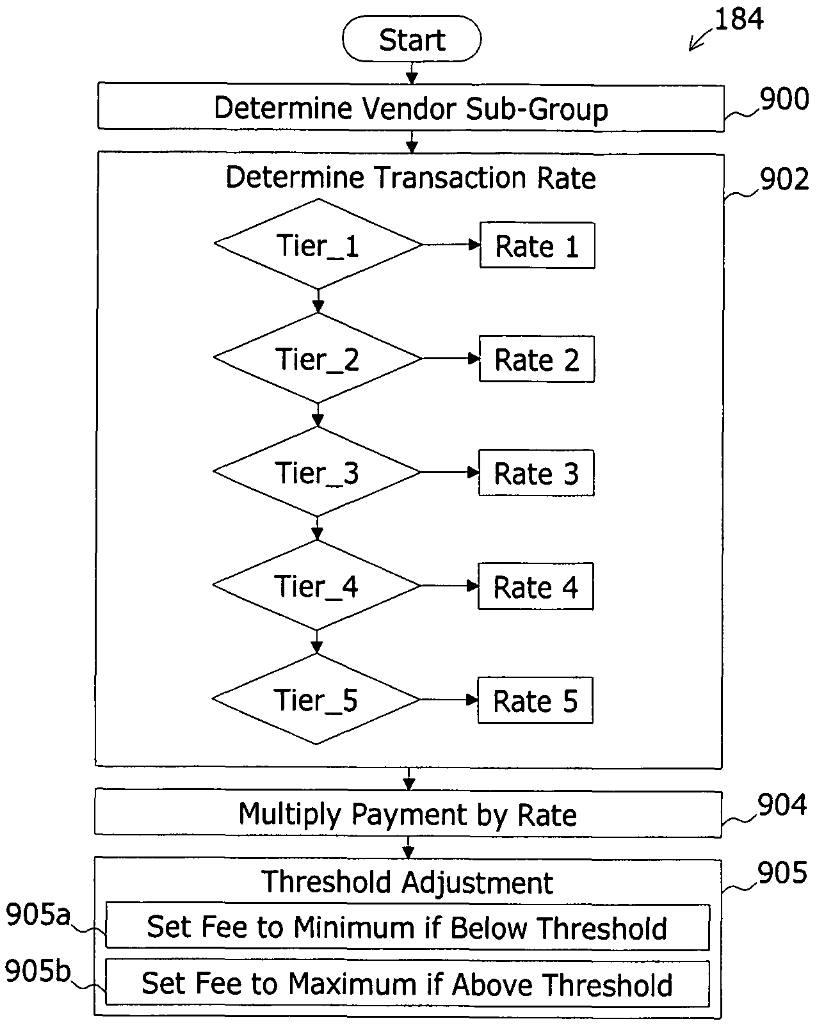
FIG. 9 is a flow chart representing exemplary instructions stored in memory and executed by a processor for determining a transaction fee to asses on a payment in accordance with an exemplary embodiment of the present invention.

Turning briefly to flow chart of FIG. 9, in conjunction with FIG. 5, identifying the payment transaction fee to apply to a payment may comprise, as represented by step 900, looking up, in the database 118, the subgroup of the payer's payer vendor subgroup to which the vendor is a member.

For example, the first payment represented in payment file 160*a*, represents a payment of $100 from payer 14*a* to vendor 12*c*. In this example, the payment bureau 10, at step 900, looks up in the payer vendor group table 140*a* associated with payer 14*a*, the transaction rate group identified in the record associated with vendor 12*c* (i.e. Tier_2) to determine the transaction rate group in which the vendor belongs. This process effectively distinguishes whether the vendor 12*c* is a member of a first subgroup, second subgroup, third subgroup, fourth subgroup, or fifth subgroup of the payer 14*a*'s payer vendor group.

Referring to FIG. 5 in conjunction with FIG. 9, step 902 represents looking up, in the transaction rate table 148*a*, the transaction rate applicable to vendor 12*c*. More specifically, the transaction rate may be a first rate (0%) if the vendor is rate group Tier_1; transaction rate may be a second rate (0.5%) if the vendor is transaction rate group Tier_2; transaction rate may be a third rate (1.25%) if the vendor is transaction rate group Tier_3; transaction rate may be a fourth rate (1.75%) if the vendor is transaction rate group Tier_4; and transaction rate may be a fifth rate (2.25%) if the vendor is transaction rate group Tier_5.

Returning again to FIG. 9, step 904 represents determining the payment transaction fee by multiplying the amount of the payment (i.e. $100 in the example) by the applicable transaction rate (i.e. 1.25% in the example because vendor 12*c* is in transaction rate group Tier_3 for payments from payer 14*a* to yield the payment transaction fee (i.e. $1.25 in the example).

Step 905 represents making a threshold adjustment to the transaction fee determined at step 904 in the event the transaction fee, as determined at step 904, is below a minimum threshold or above a maximum threshold.

Sub-step 905*a* represents setting the transaction fee to a predetermined minimum transaction fee in the event the transaction fee, as determined at step 904 is below a threshold equal to the minimum transaction fee. For example, if the predetermined minimum transaction fee is $0.75 and the transaction fee as determined at step 904 is less than $0.75, then, at step 905*a* the transaction fee would be reset to $0.75.

Sub-step 905*b* represents setting the transaction fee to a predetermined maximum transaction fee in the event the transaction fee, as determined at step 904 is above a threshold equal to the maximum transaction fee. For example, if the predetermined maximum transaction fee is $20.00 and the transaction fee as determined at step 904 is above $20.00, then, at step 905*b* the transaction fee would be reset to $20.00.

Returning to FIG. 8*a*, step 186 represents the payment bureau 10 generating disbursement instructions 186 and 188 to the payment system 30*a* to initiate: i) a debit transaction, or multiple debit transactions, to debit the payment amount from the settlement account 134 as depicted by step 190; ii) a credit transaction to credit the payment amount less the transaction fee to the vendor's transaction account as depicted by step 192; and iii) a credit transaction to credit the transaction fee to the operator account 37 as depicted by step 194.

The debit(s) of the settlement account and credits to the vendor's transaction account and operator account by funds transfer if between accounts held at the same bank or by transfer through a settlement network 32 if between accounts are held at different banks.

In an alternative embodiment, the disbursements instructions 186 and 188 may each be an instruction, or a debit/credit instruction pair, sent directly by the payment application 18 the settlement network 32 (whether separate from, or part of the payment bureau 10) to effect the initiation of a debit transaction to debit the applicable amount from the settlement account and credit the amount of the payment less the transaction fee to the vendor account and to credit the transaction fee to the operator account.

As discussed, the payment bureau will complete the disbursement steps 174 for each payment within the payment file 160*a*, which for the second payment represented in the payment file 160*a* (i.e. a payment of $200 to vendor 12*e*) includes identifying a payment transaction fee to apply to the second payment at step 184, using the process described with respect to FIG. 9, and generating the disbursement instructions to effect the credits and debits as discussed with respect to steps 186 through 194.

Similarly for the third payment represented in the payment file 160*a* (i.e. a payment of $300 to vendor 12*i*) includes identifying a payment transaction fee to apply to the third payment at step 184, using the process described with respect to FIG. 9, and generating the disbursement instructions to effect the credits and debits as discussed with respect to steps 186 through 194.

It should be appreciated that the disbursement instructions to effect the credits and debits as discussed with respect to steps 186 through 194, for each of multiple transactions, may be grouped in batches for transmission to the payment system 30*a* or the settlement network 32, more specifically, the instructions associated with each of to the first payment, second payment, and third payments may be transmitted at the same time as part of a batch.

Although the foregoing description of the funding instructions 173 contemplate funding the settlement account for the aggregate amount of all payments within the payment file through a single funding transaction. In an alternative, the funding instructions 173 may be independently performed for each payment within the payment file, in each case funding only the amount of the particular payment to the settlement account.

After disbursement instructions 174 are executed for each payment within the payment file 160, rebate instructions 175 may be executed for calculating and paying a rebate to the payer. More specifically, step 196 represents calculating a rebate due to the payer. The rebate amount due to the payer may be a fraction of the transaction fee applied to each payment made by the payer, the fraction being less than one. Or, stated another way, the rebate amount on the aggregate of a group of payments made by the payer may be a fraction of the sum of the aggregate transaction fees applied to the each payment of the group of payments, or a fraction of the of the aggregate transaction fees applied to each payment of the group of payments above a minimum transaction fee threshold.

After the amount of the rebate is determined, the payment bureau 10 may generate a rebate instruction 198 to the payment system 30*a* to initiate: i) a debit transaction to debit the amount of the rebate from the operator account 34 as depicted by step 200 and ii) a credit transaction to credit the amount of the rebate to the payer's account as depicted by step 202.

Again, the debit(s) of the operator account and credit to the payer's account may be by funds transfer if between accounts held at the same bank or by transfer through a settlement network 32 if between accounts are held at different banks.

In an alternative embodiment, the rebate instruction 198 may be an instruction, or a debit/credit instruction pair, sent directly by the payment application 18 the settlement network 32 (whether separate from, or part of the payment bureau 10) to effect the initiation of a debit transaction to debit the rebate amount from the operator account and credit the rebate amount to the payer's account.

In one embodiment, the payment bureau 10 performs the rebate steps 175 once per payment, meaning the payment bureau 10 may calculate and disburse a rebate to the payer on each payment within the payment file.

In a second embodiment, the payment bureau 10 performs the rebate steps 175 once for all payments within the payment file, meaning the payment bureau 10 may calculate and disburse a rebate to the payer based at least in part on the aggregate of the payments, or the aggregate amount of the payments, within the payment file.

In a third embodiment, the rebate steps 175 may be performed only after multiple payment files are received from the payer over a set period of time, for example payment steps 175 may be performed only once every six (6) months for calculating a rebate based on the group of all payments made by the payer during a six (6) month period preceding the calculation and payment of the rebate.

In yet a fourth embodiment, rebate steps 175 may be performed only after multiple payment files are received from the payer which in the aggregate total a certain payment value. For example the aggregate value of all payments made by the payer achieves a threshold value which triggers performance of the payment steps 175 and payment of a rebate based on payments used for calculating the aggregate total.

Figure 8B:
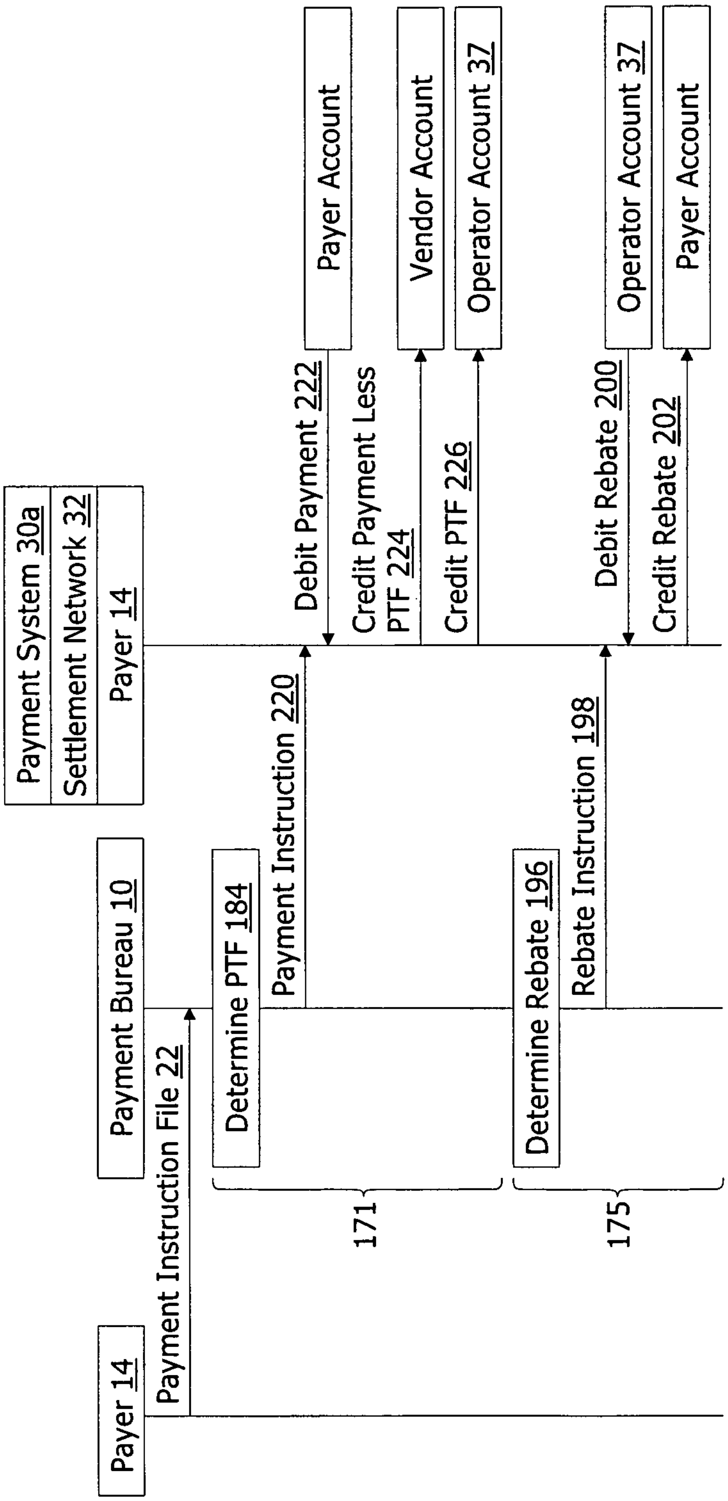
FIG. 8*b* is a ladder diagram representing a combination of data structures and instructions stored in memory and executed by a processor for making payments from each payer of a community of payers to each vendor of a community of vendors assesses a variable transaction fee to each vendor, all in accordance with an exemplary embodiment of the present invention.

Referring to the ladder diagram of FIG. 8*b* in conjunction with FIG. 1, in yet another exemplary embodiment of operation, the payment bureau 10 receives a payment file, for example payment file 160*b* (FIG. 7*b*) from payer 14*b*, as represented by step 22. The payment instruction file may be transferred via a secure connection over the network 20 which may include implementing encryption of the connection and/or the file transferred over the connection.

Upon receiving and authenticating the payment file 160, the payment bureau 10, or more specifically, the processor 40 executing the payment application 18, performs payment steps 171 for each payment represented in the payment file 160. Step 184 represents determining the payment transaction fee to apply to the payment as discussed with respect to FIG. 9.

The payment bureau then generates payment instruction 220 to the payment system 30*a* to initiate: i) a debit transaction to debit the payment amount from the payer's account as depicted by step 226; ii) a credit transaction to credit the payment amount less the transaction fee to the vendor's transaction account as depicted by step 224; and iii) a credit transaction to credit the transaction fee to the operator account 37 as depicted by step 226.

Again, the debit(s) of the payers transaction account and credits to the vendor's transaction account and operator account by funds transfer if between accounts held at the same bank or by transfer through a settlement network 32 if between accounts held at different banks.

Again, the payment instruction 220 may be an instruction, or a debit/credit instruction combination, sent directly by the payment application 18 to the settlement network 32 (whether distinct from the payment bureau 10 or part of the payment bureau 10) to effect the initiation of a debit transaction to debit the applicable amount from the payers transaction account and credit the amount of the payment less the transaction fee to the vendor transaction account and to credit the transaction fee to the operator account.

After disbursement steps 171 are executed for each payment within the payment file 160, rebate steps 175 may be executed for calculating and paying a rebate to the payer. More specifically, step 196 represents calculating a rebate due to the payer in the manner discussed with respect to FIG. 8*a*. After the amount of the rebate is determined, the payment bureau 10 may generate a rebate instruction 198 to the payment system 30*a* to initiate: i) a debit transaction to debit the amount of the rebate from the operator account 34 as depicted by step 200 and ii) a credit transaction to credit the amount of the rebate to the payer's account as depicted by step 202.

In one embodiment, the payment bureau 10 performs the rebate instructions 175 once per payment, meaning the payment bureau 10 may calculate and disburse a rebate to the payer on each payment within the payment file.

In a second embodiment, the payment bureau 10 performs the rebate instructions once for all payments within the payment file, meaning the payment bureau 10 may calculate and disburse a rebate to the payer based at least in part on the aggregate of the payments, or the aggregate amount of the payments, within the payment file.

In a third embodiment, the rebate instructions 175 may be performed only after multiple payment files are received from the payer over a set period of time, for example payment instructions 175 may be performed only once every six (6) months for calculating a rebate based on all payments made by the payer during a six (6) month period preceding the calculation and payment of the rebate.

In yet a fourth embodiment, rebate steps 175 may be performed only after multiple payment files are received from the payer which in the aggregate total a certain payment value. For example the aggregate value of all payments made by the payer achieves a threshold value which triggers performance of the payment steps 175 and payment of a rebate based on payments used for calculating the aggregate total.

Figure 8C:
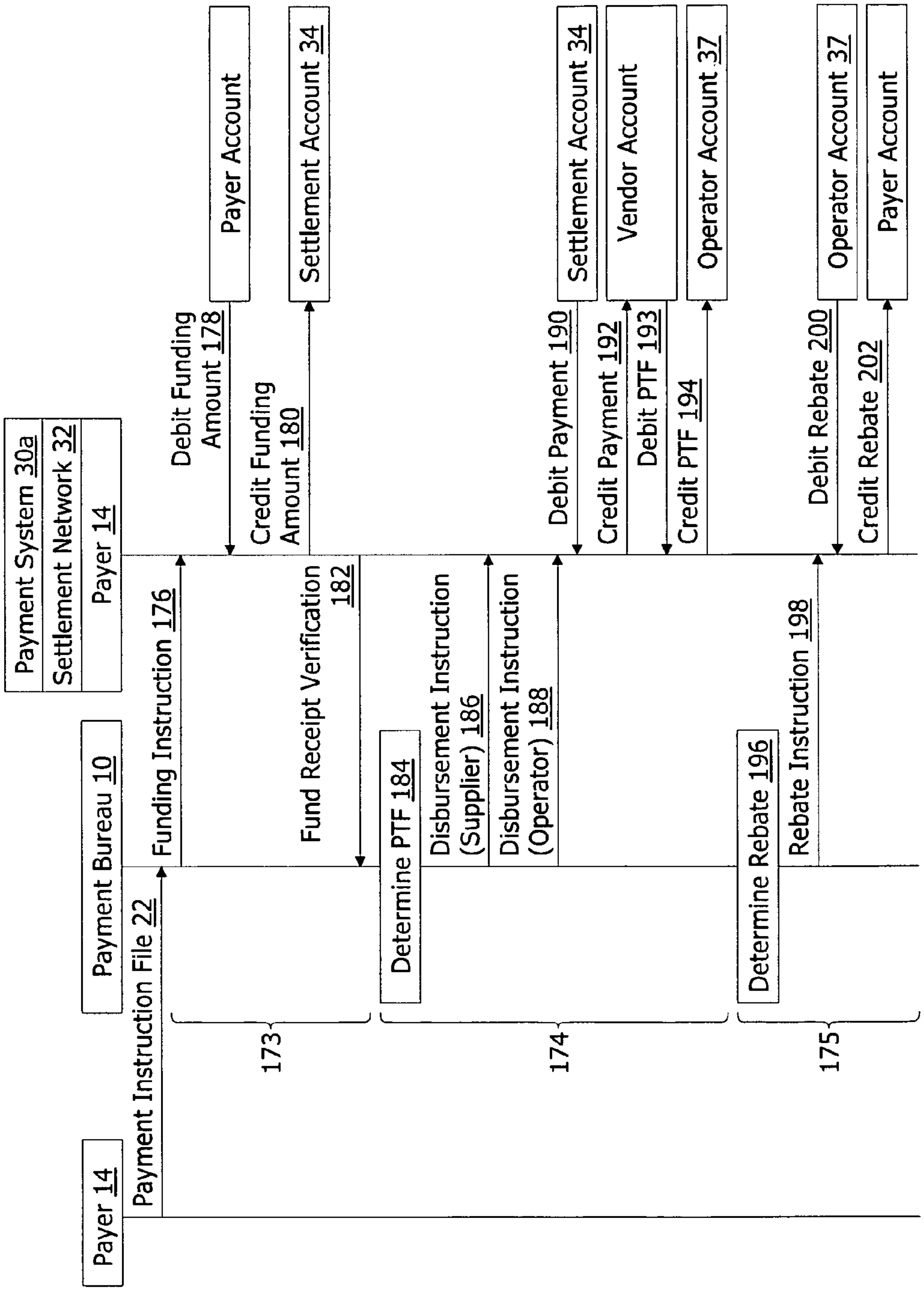
FIG. 8*c* is a ladder diagram representing a combination of data structures and instructions stored in memory and executed by a processor for making payments from each payer of a community of payers to each vendor of a community of vendors assesses a variable transaction fee to each vendor, all in accordance with an exemplary embodiment of the present invention.

Referring to the ladder diagram of FIG. 8*c* in conjunction with FIG. 1, in an exemplary embodiment of operation, the payment bureau 10 receives a payment file, for example payment file 160*a* (FIG. 7*a*) from payer 14*a*, as represented by step 22. The payment instruction file may be transferred via a secure connection over the network 20 which may include implementing encryption of the connection and/or the file transferred over the connection.

Upon receiving and authenticating the payment file 160, the payment bureau 10, or more specifically, the processor 40 executing the payment application 18, performs funding steps 173 to transfer a funding amount equal to the aggregate or sum of the amount of all payments in the payment file 160 from the payer's account (account 36*a* at bank 28*a*) to the settlement account 34 as described in more detail with respect to FIG. 8*a*.

After the funding amount is received in the settlement account 34, disbursement steps 174 are performed for each payment represented in the payment file. In executing the disbursement steps 174 for a payment, the payment bureau 10 identifies a payment transaction fee to apply to the payment at step 184 as described with respect to FIG. 9.

Step 186 represents the payment bureau 10 generating disbursement instructions 186 and 188 to the payment system 30*a* to initiate: i) a debit transaction, or multiple debit transactions, to debit the payment amount from the settlement account 134 as depicted by step 190; ii) a credit transaction to credit the payment amount to the vendor's transaction account as depicted by step 192; iii) a debit transaction to debit the transaction fee from the vendor's transaction account as depicted at step 193; and iv) a credit transaction to credit the transaction fee to the operator account 37 as depicted by step 194.

The debit(s) of the settlement account, credits and debits to the vendor's transaction account, and credits to operator account by funds transfer if between accounts held at the same bank or by transfer through a settlement network 32 if between accounts are held at different banks.

In an alternative embodiment, the disbursements instructions 186 and 188 may each be an instruction, or a debit/credit instruction pair, sent directly by the payment application 18 the settlement network 32 (whether separate from, or part of the payment bureau 10) to effect the initiation of a debit transaction to debit the applicable amount from the settlement account, credit the amount of the payment to the vendor account, debit the amount of the transaction fee from the vendor account, and to credit the transaction fee to the operator account.

As discussed, the payment bureau will complete the disbursement steps 174 for each payment within the payment file 160*a*, which for the second payment represented in the payment file 160*a* (i.e. a payment of $200 to vendor 12*e*) includes identifying a payment transaction fee to apply to the second payment at step 184, using the process described with respect to FIG. 9, and generating the disbursement instructions to effect the credits and debits as discussed with respect to steps 186 through 194.

Similarly for the third payment represented in the payment file 160*a* (i.e. a payment of $300 to vendor 12*i*) includes identifying a payment transaction fee to apply to the third payment at step 184, using the process described with respect to FIG. 9, and generating the disbursement instructions to effect the credits and debits as discussed with respect to steps 186 through 194.

It should be appreciated that the disbursement instructions to effect the credits and debits as discussed with respect to steps 186 through 194, for each of multiple transactions, may be grouped in batches for transmission to the payment system 30*a* or the settlement network 32, more specifically, the instructions associated with each of the first payment, second payment, and third payments may be transmitted at the same time as part of a batch.

After disbursement instructions 174 are executed for each payment within the payment file 160, rebate instructions 175 may be executed for calculating and paying a rebate to the payer as describe with respect to FIG. 8*a*.

Figure 8D:
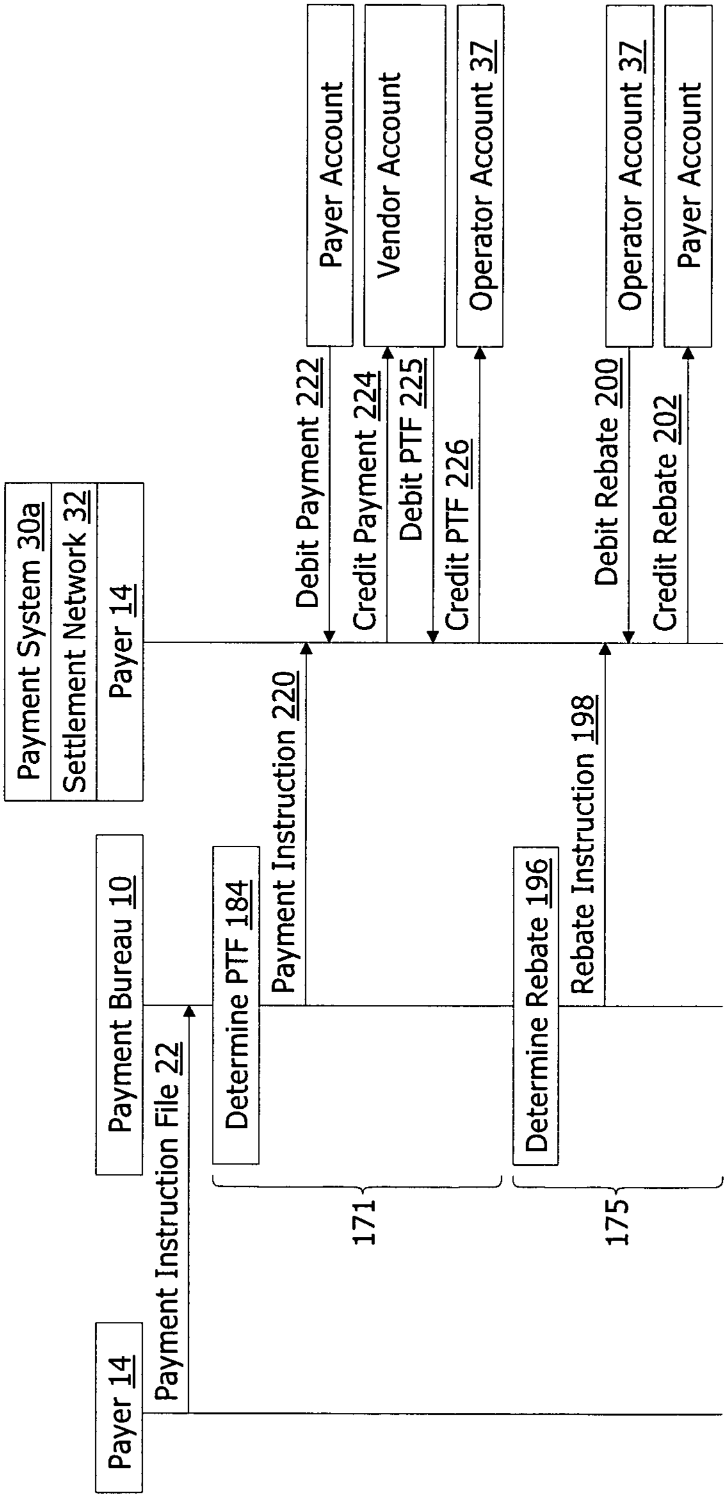
FIG. 8*d* is a ladder diagram representing a combination of data structures and instructions stored in memory and executed by a processor for making payments from each payer of a community of payers to each vendor of a community of vendors assesses a variable transaction fee to each vendor, all in accordance with an exemplary embodiment of the present invention.

Referring to the ladder diagram of FIG. 8*d* in conjunction with FIG. 1, in yet another exemplary embodiment of operation, the payment bureau 10 receives a payment file, for example payment file 160*b* (FIG. 7*b*) from payer 14*b*, as represented by step 22. The payment instruction file may be transferred via a secure connection over the network 20 which may include implementing encryption of the connection and/or the file transferred over the connection.

Upon receiving and authenticating the payment file 160, the payment bureau 10, or more specifically, the processor 40 executing the payment application 18, performs payment steps 171 for each payment represented in the payment file 160. Step 184 represents determining the payment transaction fee to apply to the payment as discussed with respect to FIG. 9.

The payment bureau then generates payment instruction 220 to the payment system 30*a* to initiate: i) a debit transaction to debit the payment amount from the payer's account as depicted by step 226; ii) a credit transaction to credit the payment amount to the vendor's transaction account as depicted by step 224; iii) a debit transaction to debit the transaction fee from the vendors account as depicted by step 225; and iv) a credit transaction to credit the transaction fee to the operator account 37 as depicted by step 226.

Again, the debit(s) of the payers transaction account, credits and debits to the vendor's transaction account, and credits to the operator account may be by funds transfer if between accounts held at the same bank or by transfer through a settlement network 32 if between accounts held at different banks.

Again, the payment instruction 220 may be an instruction, or a debit/credit instruction combination, sent directly by the payment application 18 to the settlement network 32 (whether distinct from the payment bureau 10 or part of the payment bureau 10) to effect the initiation of a debit transaction to debit the applicable amount from the payers transaction account, credit the amount of the to the vendor transaction account, debit the amount of the transaction fee from the vendor's transaction account, and credit the amount of the transaction fee to the operator account.

After disbursement steps 171 are executed for each payment within the payment file 160, rebate steps 175 may be executed for calculating and paying a rebate to the payer as described with respect to FIG. 8*b*, In summary, the present invention provides a system for making payments from a payer to a community of vendors, assessing a variable transaction fee to each vendor, and providing a variable rebate to the payer. Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A system for making payments from a payer of a group of payers to a vendor of a group of vendors and assessing a transaction fee to the vendor, the system comprising:

in association with each payer of the group of payers, the following data stored in a non transient computer readable media:

a rate tier sub database identifying a transaction fee percentage applicable to each rate tier of a group of rate tiers;

a vendor sub database identifying each vendor in a subgroup of vendors to which the payer makes payment, the subgroup of vendors being fewer vendors than the community of vendors; and within the vendor sub database, in association with each vendor of the subgroup of vendors, identification a selected rate tier assigned to the vendor, the selected rate tiers being one of the rate tiers of the group of rate tiers;

a rate tier assignment application, the rate tier assignment application comprising instructions stored in a non transient computer readable media and executed by a processor, for determining the selected rate tier for each vendor identified in the vendor sub database, the instructions comprising:

looking up an industry sensitivity score to assign to the vendor, the industry sensitivity score being a score value assigned to an industry in which the vendor participates and is representative of historical fee rates that have been accepted by other participants in the industry in which the vendor participates;

calculating an overall score for the vendor, the overall score being a function of at least the industry sensitive score assigned to the vendor;

looking up a selected rate tier associated with the overall score calculated for the vendor and writing the selected rate tier to the vendor sub database in association with the vendor;

a payment application for executing a payment from the a selected payer to a selected vendor, the payment application comprising instructions stored in a non transient computer readable media and executed by a processor, the instructions comprising:

looking up, in the vendor sub database associated with the selected payer, the selected rate tier associated with the selected vendor;

looking up, in the rate tier sub database, the transaction fee percentage associated with the selected rate tier associated with the selected vendor;

determining a transaction fee to apply to the payment, the transaction fee being a product of the amount of the payment multiplied by the transaction fee percentage associated with the selected rate tier associated with the selected vendor;

initiating payment to an account of the selected vendor a net amount equal to the payment less the transaction fee.

2. The system of claim 1, wherein:

the data stored in the non transient computer readable media further includes a sensitivity score sub database, the sensitivity score sub database associating each of a group of industry codes with a sensitivity rating, the sensitivity rating being one of a group of discrete sensitivity rating values; and looking up the industry sensitivity score to assign to the vendor comprises:

obtaining the vendor's industry code, the vendor's industry code being an industry code of the group of industry codes which identifies the industry in which the vendor participates;

looking up in the sensitivity score sub database, the industry sensitivity score associated with the vendor's industry code.

3. The system of claim 2, wherein the instructions of the rate tier assignment application further:

determine a payer centric spend score for the vendor, the payer centric spend score being a function of the aggregate amount of all payments the selected payer expects to pay the vendor during a predetermined period;

determine a payer centric frequency score for the vendor, the payer centric frequency score being a function of the total quantity of payments the selected payer expects to pay the vendor during the predetermined period; and the overall score is further a function of the payer centric spend score for the vendor and the payer centric frequency score for the vendor.

4. The system of claim 3, wherein calculating the overall score comprises:

multiplying the industry sensitivity score for the vendor by a first weight factor to determine a weighted industry sensitivity score;

multiplying the payer centric spend score for the vendor by a second weight factor to determine a weighted payer centric spend score;

multiplying the payer centric frequency score for the vendor by a third weight factor to determine a weighted payer centric frequency score;

calculating the overall score as the average of the weighted industry sensitivity score, the weighted payer centric spend score, and the weighted payer centric frequency score.

5. The system of claim 3, wherein the instructions of the rate tier assignment application further:

determine a network spend score for the vendor, the network spend score for the vendor being a function of the aggregate amount of all payments expected to be paid to the vendor by multiple payers within the group of payers during the predetermined period;

determine a network frequency score for the vendor, the network frequency score being a function of the total quantity of payments expected to be paid to the selected vendor by multiple payers within the group of payers during the predetermined period; and wherein the overall score is further a function of the network spend score for the vendor and the network frequency score for the vendor.

6. The system of claim 5, wherein calculating the overall score comprises:

multiplying the industry sensitivity score for the vendor by a first weight factor to determine a weighted industry sensitivity score;

multiplying the payer centric spend score for the vendor by a second weight factor to determine a weighted payer centric spend score;

multiplying the payer centric frequency score for the vendor by a third weight factor to determine a weighted payer centric frequency score;

multiplying the network spend score for the vendor by a fourth weight factor to determine a weighted network spend score;

multiplying the network frequency score for the vendor by a fifth weight factor to determine a weighted network frequency score; and calculating the overall score as the average of the weighted industry sensitivity score, the weighted payer centric spend score, and the weighted payer centric frequency score, the weighted network spend score, and the weighted network frequency score.

7. The system of claim 2, wherein the instructions of the rate tier assignment application further:

determine a network spend score for the vendor, the network spend score for the vendor being a function of the aggregate amount of all payments expected to be paid to the vendor by multiple payers within the group of payers during a predetermined period;

determine a network frequency score for the vendor, the network frequency score for the vendor being a function of the total quantity of payments expected to be paid to the vendor by multiple payers within the group of payers during the predetermined period; and the overall score is further a function of the network spend score for the vendor and the network frequency score for the vendor.

8. The system of claim 7, wherein calculating the overall score comprises:

multiplying the industry sensitivity score for the vendor by a first weight factor to determine a weighted industry sensitivity score;

multiplying the network spend score for the vendor by a second weight factor to determine a weighted network spend score;

multiplying the network frequency score by a third weight factor to determine a weighted network frequency score;

calculating the overall score as the average of the weighted industry sensitivity score, the weighted network spend score, and the weighted network frequency score.

* * * * *